April 21, 1936.　　　E. A. EVERETT　　　2,038,210
RAIL BOND
Filed Sept. 14, 1929　　　2 Sheets-Sheet 1

INVENTOR.
Edward A. Everett
BY
　　Attorney.

April 21, 1936.  E. A. EVERETT  2,038,210
RAIL BOND
Filed Sept. 14, 1929   2 Sheets-Sheet 2

INVENTOR.
Edward A. Everett
BY
M. H. Loughridge
ATTORNEY.

Patented Apr. 21, 1936

2,038,210

UNITED STATES PATENT OFFICE 2,038,210

RAIL BOND

Edward A. Everett, Long Island City, N. Y.

Application September 14, 1929, Serial No. 392,631

3 Claims. (Cl. 173—280)

Figure 1:
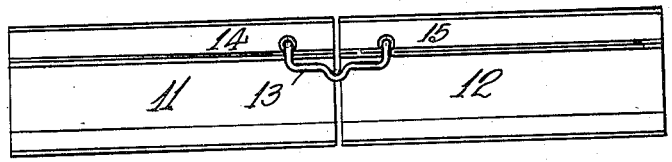
Figure 2:
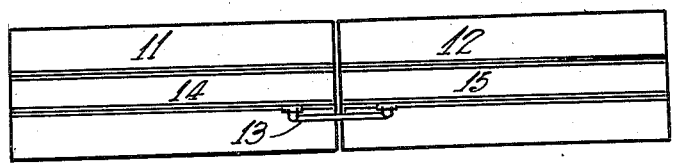
Figures 3, 4:
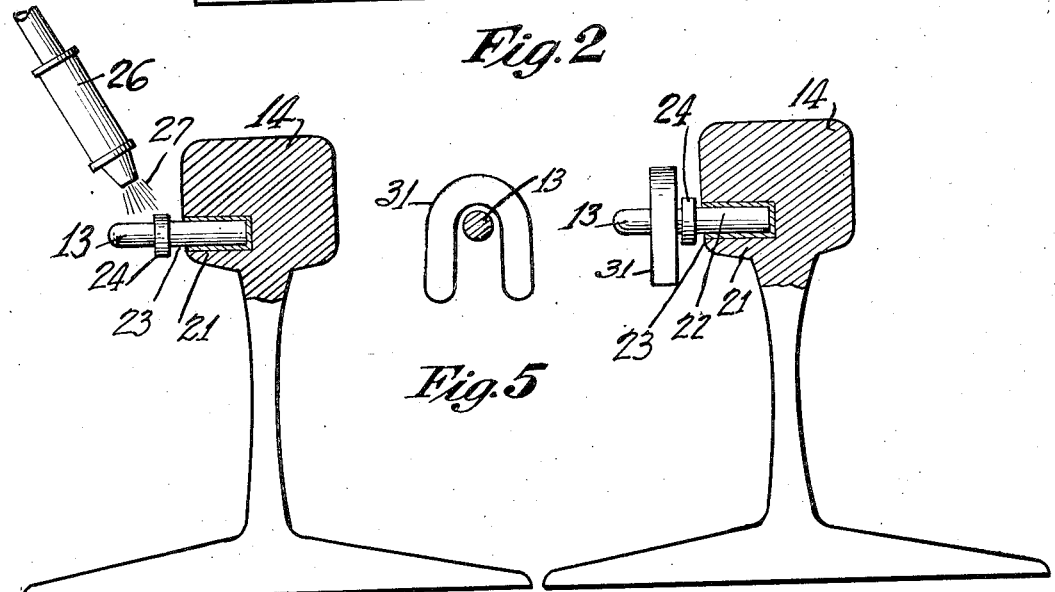
Figure 6:
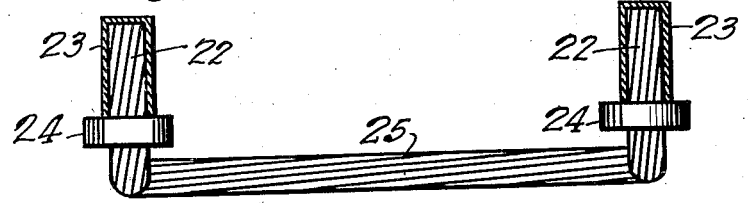

This invention relates to rail bonds and particularly to a method of securing an electric conductor to a terminal in which the bond may be regarded as the conductor and the rail ends to which the bond is secured as the terminals. The objects of the invention are to secure an electrical connection between a conductor and a terminal which is easy to apply; which forms a waterproof seal when made, thereby avoiding corrosion; which is tightened in the process of attachment and which may readily be removed and replaced. Other objects of the invention will appear from the following specification and the accompanying drawings, in which, Fig. 1 is a side elevation of the abutting ends of a pair of railway rails bonded according to this invention with an electric conductor; Fig. 2 is a plan view corresponding to Fig. 1; Fig. 3 is an elevation of a railway rail with the head portion shown in section to illustrate the method of attaching the bond; Fig. 4 is another end elevation of a railway rail showing the bond in place; Fig. 5 is a device that may be used to generate the heat necessary for the application or removal of the bond and Fig. 6 is a form of stranded bond complete with the attaching sleeve shown in section.

Figure 7:
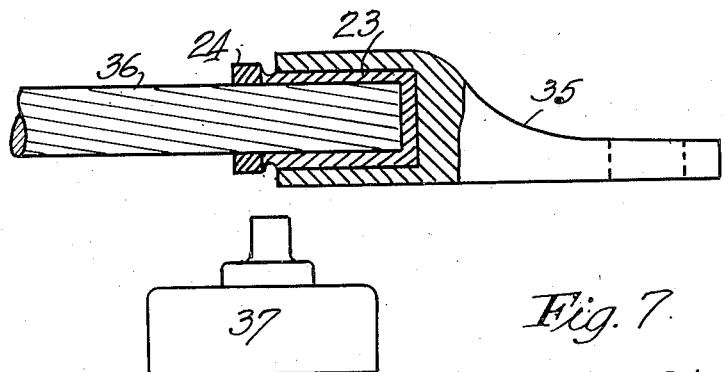
Figure 8:
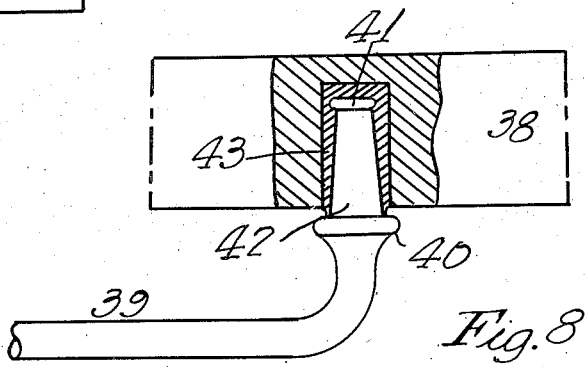
Figure 9:
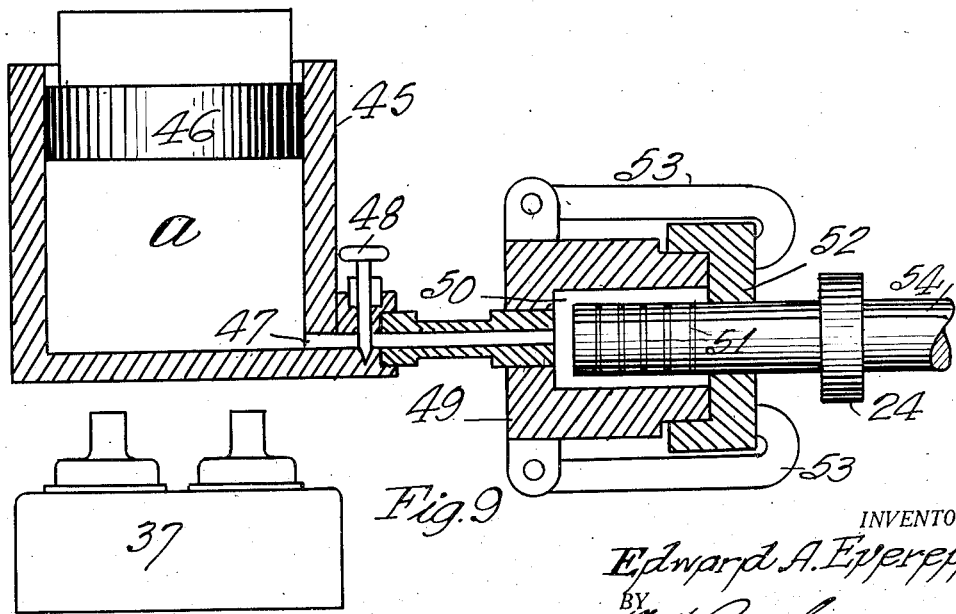

Fig. 7 shows an application of my invention for securing a solid terminal to a stranded conductor; Fig. 8 is a view, partly sectioned, showing a method of securing a solid conductor according to this invention to a terminal plate, and Fig. 9 illustrates, partly in section, a process in the manufacture of this connection.

The established practice in securing rail bonds to the ends of rails is either by a tapered pin secured by a driving fit in a hole in the rail or by welding the bond to the rail. The latter construction provides a satisfactory contact electrically but is expensive to apply, does not readily admit of changing the bond, and the heat required in the welding process changes the temper of the rail and impairs its efficiency. The tapered pin attachment does not provide a sealed or waterproofed connection between the conductor and the rail with the result that moisture eventually enters the drilling and rust develops. In addition to this it is practically impossible to remove the tapered pin in case it is desired to replace the bond so that replacements can be made only by drilling new holes and such drilling is objectionable in the head or ball of the rail. Another objection to the taper pin construction is the fact that the bond is secured tightly against the edge of the hole and this edge tends to chafe the conductor and develop a mechanical weakness at this point.

In the present invention the conductor is provided with a sleeve made from a fusible alloy and is inserted in a hole in the terminal with an easy fit. Fusible metals are made from a number of different alloys of which bismuth, lead and tin are the principal metals used and may be so proportioned to melt at different temperatures. The preferred alloy in the present invention should have a melting point of approximately 300° F. It is well known that these alloys, on changing from the liquid to the solid state, expand and advantage is taken of this fact to first apply heat to the conductor until the alloy is reduced to a liquid state, then confine the alloy and the conductor in the hole in the terminal until the metal sets or solidifies, thereby securing a sealed connection in the hole and a connection that is automatically tightened by the expanding alloy.

The conductor is usually made of copper which is a good conductor of heat and in practice heat may be applied to the conductor where it enters the hole to fuse the alloy within the hole. This enables the ends of a conductor to be removed from a terminal as well as facilitating the application of the conductor to the terminal.

The fusible alloy forms a sleeve around the end of the conductor where it is inserted in the hole of a comparatively soft metal thereby preventing the sharp edges of the hole coming directly into contact with the conductor, thus avoiding chafing at this point and the soft metal tends to reduce vibration and crystallization at the point where the conductor leaves the terminal. When the conductor is made of stranded wire, the sleeve of alloy metal may be applied to the strands of the conductor under pressure so as to fill the spaces between the strands and to form a binder for the wires of the conductor before it is applied to the rail.

In the application of this invention the fusible alloy melts at a temperature which is not injurious to the rail head or terminal while, at the same time, it remains rigid and solid under ordinary temperatures and is not materially influenced by the current conducted through the bond.

In the drawings, 11 and 12 are the ends of abutting rails which are connected by the electric bond 13, secured at one end to the ball of the rail 14 and at the opposite end to the ball of the rail 15. This bond may be constructed as shown in Fig. 6, in which 25 indicates a stranded conductor provided with a sleeve 23 on each end 22 and with the collar 24. The sleeve 23 is made of a fusible metal and the collar 24 may be made of asbestos or metal and is constructed to slide on the conductor and abut against the sleeve 23.

The rail head 14 is drilled as indicated at 21 to receive the sleeve 23 with an easy fit so that the ends of the conductor can be placed in the drilling of the rails without applying a strain to the conductor. When the ends of the bond have been inserted in the drilling in each rail heat is applied to the conductor of the bond until the fusible metal is reduced to a liquid. In Fig. 3, the heat is obtained from the torch 26 which plays the flame 27 upon the conductor 13 until its temperature is raised to the melting point of the fusible metal. The conductor 13 is usually made of copper which is a comparatively good conductor of heat and which conducts the heat into the drilling so as to melt the sleeve 23. As soon as the sleeve begins to flow the collar 24 is forced against the aperture as indicated in Fig. 4 so as to form a closure for the aperture and confine the liquid metal therein. The alloy of the sleeve crystallizes on solidifying and, at the same time expands, thereby forming a tight seal between the end of the conductor and the rail head.

In the above described operation it should be noted that the fusible metal melts at a comparatively low melting point or temperature which does not affect the iron of the rail and does not affect the copper conductor while, at the same time, this sleeve sets rigidly and forms a tight mechanical connection between the bond and the rail which is sealed with an airtight seal and is therefore waterproof, also the sleeve prevents the conductor from directly engaging the edge of the hole and thus prevents abrasion developing at this point. It will be noted that the collar 24 may be applied between the torch and the terminal so that the terminal is thereby shielded from the torch if this procedure is necessary. The procedure described refers to the application of the bond to the rail; the bond may be removed from the rail head simply by heating the projecting end of the bond until the sleeve is melted when the bond can be withdrawn. Thus a broken bond can be easily replaced in the original drilling.

In practice on a railroad, bonds may be heated in an emergency by the use of oily waste or other material that will concentrate a flame upon the conductor, or a device similar to that shown in Fig. 5 may be used for this purpose in which the U-shaped member 31 may consist of cotton wicking saturated with an inflammable fluid or with an inflammable powder and may be placed over the conductor 13 as shown so that when lighted it generates sufficient heat to fuse the sleeve 23.

In Fig. 7, this invention is shown applied to the connection between a conductor and a solid terminal in which, 36 is a stranded conductor provided with the fusible sleeve 23 which is inserted in the aperture in the terminal 35 and is provided with the collar 24. This connection is applied or removed as described when heated by the torch 37.

In Fig. 8, the solid conductor 39 is attached to the terminal plate 38 by the process described in this invention. The conductor 39 is provided with an upset collar at 40 and a tapering stem 42 which terminates in the collar 41. The sleeve 43, it will be noted, has tapering walls on account of the tapered stem 42 which concentrates the fusible metal at the base of the hole. This enables the fusible metal to flow freely in the hole and more particularly the concentration of this metal at the base of the hole as it solidifies and expands increases the tightness of the connection while the collar 41 is embedded in the sleeve and makes a mechanical connection which cannot readily be withdrawn except by melting the sleeve.

Attention is called to the fact in the application of this invention that the heat applied to the conductor to melt the sleeve causes an expansion of the conductor itself with a corresponding shrinkage when the conductor cools, however, the co-efficient of expansion of the copper conductor is a comparatively negligible quantity when compared with the expansion of the fusible metal when changing from the liquid to the solid state and in practice no difficulty arises from this condition in practising the invention. In Fig. 8, it will be noted that the small end of the stem 42 has approximately the same cross section as the sleeve at this point so that a comparatively large shrinkage of the sleeve is obtained at the point where the cross section of the conductor is subject to very little expansion due to the heat conducted thereby.

One method of forming conductors in practising this invention is illustrated in Fig. 9, in which 45 is a cylinder having a weighted plunger 46 applying pressure to chamber $a$ containing the fusible alloy which is maintained in a liquid state by the torch 37. The chamber $a$ connects by passage 47 with the mold 49 and is controlled by the valve 48. The cavity 50 of the mold is provided with the cover 52 held in position by the cleats 53. The conductor 54 is inserted through an aperture in the cover 52 into the cavity 50. In this way the alloy in chamber $a$ is moulded under pressure around the conductor 54 which may be corrugated as indicated at 51 or in the case of stranded conductors as 36 the alloy is forced into the spaces between the conductors thereby forming a binder for the strands of the conductor and sealing the spaces between the strands to make the conductor waterproof.

In the drawings the sleeve has been illustrated as attached to the conductor and then inserted in the hole of the terminal, it should be understood, however, that the sleeve may be made separately from the conductor and applied to the end of the conductor at the time of installation or applied to the drilling before the conductor is inserted, the type of construction used being determined by the conditions of manufacture and application. With stranded conductors it is desirable to apply the sleeves to the strands so as to hold the strands together until the bond is applied to the rail. In applying the bond or conductor to the terminal it is preferred that the assembly may be done by hand and without forcing the parts together and the drilling should have a clearance to permit this to be carried out so that the conductor is sealed into the terminal without any initial strain. The moulded sleeve secures a uniform size for the rail hole which can be made a comparatively close, but easy fit for the hole and there is little space to be taken up in the expansion of the sleeve until the rigid walls of the hole are engaged by the expanding metal.

This construction makes a perfect electrical connection between the conductor and the terminal and is capable of being applied in a variety of ways of which only a few are illustrated in the drawings.

Having thus described my invention, I claim:

1. The combination, a railway rail and a bond forming an electrical connection with said rail, comprising a conductor with a sleeve of fusible metal on its end which expands on cooling, said sleeve having its greatest cross-section at the end and being placed in a cylindrical bottomed hole in the rail and secured in the hole by fusing the metal.

2. The combination, a railway rail and a bond forming an electrical connection with the rail, comprising a stranded conductor having its end prepared with a sleeve of fusible metal, which expands on cooling, to hold the strands together, the rail having a hole to receive the sleeve with a comparatively easy fit and the conductor being secured in place by fusing the sleeve.

3. The combination, a railway rail and a bond forming an electrical connection therewith comprising a conductor with a sleeve of fusible metal on its end which expands on cooling and a non-fusible collar adjacent said sleeve, the rail having a bottomed hole to receive the sleeve and the conductor being secured in the hole by fusing the sleeve.

EDWARD A. EVERETT.